United States Patent [19]

Watanabe et al.

[11] Patent Number: 4,678,053

[45] Date of Patent: Jul. 7, 1987

[54] TILTABLE TRICYCLE

[75] Inventors: Masaki Watanabe; Hitoshi Yamamoto; Yoshinori Matsuoka, all of Saitama; Kunihiko Tanaka, Tokyo, all of Japan

[73] Assignee: Honda Giken Kogyo Kabushiki Kaisha, Tokyo, Japan

[21] Appl. No.: 918,635

[22] Filed: Oct. 14, 1986

Related U.S. Application Data

[63] Continuation of Ser. No. 569,256, Jan. 9, 1984, abandoned.

[30] Foreign Application Priority Data

Jan. 8, 1983 [JP] Japan .................................. 58-1549

[51] Int. Cl.$^4$ ............................................. B62D 61/06
[52] U.S. Cl. ..................................... 180/210; 180/217
[58] Field of Search ...................... 180/210, 217, 227; 280/284, 285, 286, 288

[56] References Cited

U.S. PATENT DOCUMENTS

| | | | |
|---|---|---|---|
| 3,094,187 | 6/1963 | Horowitz | 180/217 |
| 3,938,609 | 2/1976 | Kensaku et al. | 180/210 |
| 4,325,449 | 4/1982 | D'Addio et al. | 180/210 X |
| 4,356,876 | 11/1982 | Watanabe et al. | 180/210 |
| 4,392,536 | 7/1983 | Iwai et al. | 180/227 X |
| 4,469,188 | 9/1984 | Mita | 180/217 X |
| 4,494,623 | 1/1985 | Kurata et al. | 180/230 |

FOREIGN PATENT DOCUMENTS

| | | | |
|---|---|---|---|
| 549637 | 4/1922 | France | 180/217 |
| 2045705 | 11/1980 | United Kingdom | 180/210 |

Primary Examiner—Carlton R. Croyle
Assistant Examiner—T. W. Olds
Attorney, Agent, or Firm—Irving M. Weiner; Joseph P. Carrier; Pamela S. Burt

[57] ABSTRACT

A tiltable tricycle comprises a body frame, a single front wheel steerably supported on a front portion of the body frame, a power unit mounted on a rear portion of the body frame and including at least an engine, a joint case connected to the power unit for vertical angular movement, a rear axle support case connected to the joint case for lateral rolling movement, a rear axle assembly rotatably supported on the rear axle support case, a pair of rear wheels coupled to the rear axle assembly, respectively, and a shock absorber disposed between the body frame and the joint case.

7 Claims, 7 Drawing Figures

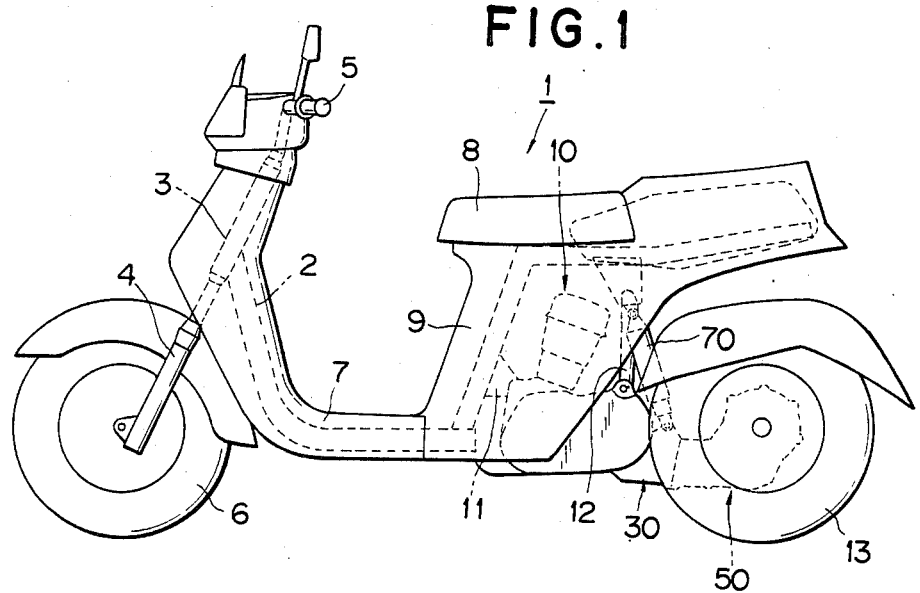
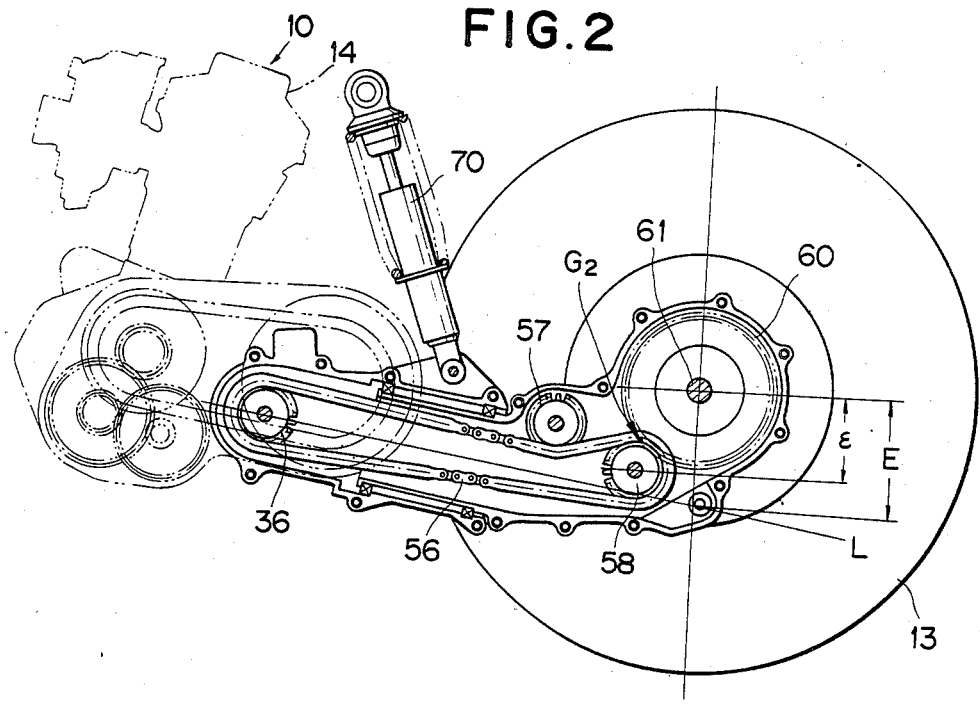

TILTABLE TRICYCLE

This is a continuation of application Ser. No. 569,256, filed Jan. 9, 1984 now abandoned.

BACKGROUND OF THE INVENTION

1. Field of the Invention

The present invention relates to a tiltable tricycle having a body which is tiltable laterally while two rear wheels are held in contact with a road surface.

2. Description of the Prior Art

Prior tiltable tricycles of the type described have a heavy power unit, a speed reducer mechanism, and two rear wheels all supported by a shock absorber, as shown in U.S. Pat. No. 3,504,934 issued on Apr. 7, 1970 to G. L. Wallis. However, the known construction is disadvantageous in that the unsprung weight of the shock absorber is increased thus adversely affecting the riding comfort and maneuvering stability.

Where a power transmission system incorporating a belt or chain which gives good maneuvering stability is employed for transmitting engine power to the rear wheels, it is necessary to use a constant-velocity joint. In consideration of the durability of the constant-velocity joint, the engine output has to be sufficiently reduced in speed before it is transmitted to the constant-velocity joint.

Good maneuvering stability of the tiltable tricycle requires that the longitudinal axis of a rear body which is angularly movable up and down be positioned as low as possible. If the rear wheels have a reduced diameter and the rear wheel axle is lowered to meet the requirement, then a minimum height required of the tricycle body above the ground cannot be maintained, and the ability of the tricycle to run over bumpy terrain is reduced.

The present invention has been made in an effort to effectively eliminate the foregoing drawbacks experienced with the conventional tiltable tricycle.

SUMMARY OF THE INVENTION

It is an object of the present invention to provide a tiltable tricycle having a shock absorber of a reduced unsprung weight for reducing the moment of inertia induced when rear wheels are pivotably moved up and down, thereby improving riding comfort and maneuvering stability.

Another object of the present invention is to provide a tiltable tricycle including a constant-velocity joint having an increased durability by sufficiently reducing the engine output in speed before it is transmitted to the constant-velocity joint.

Still another object of the present invention is to provide a tiltable tricycle which has both maneuvering stability and the ability to run over rough or bumpy terrain.

A tiltable tricycle according to the present invention comprises a body frame, a single front wheel steerably supported on a front portion of the body frame, a power unit mounted on a rear portion of the body frame and including at least an engine, a joint case connected to the power unit for vertical angular movement, a rear axle support case connected to the joint case for lateral rolling movement, a rear axle assembly rotatably supported on the rear axle support case, a pair of rear wheels coupled to the rear axle assembly, respectively, and a shock absorber disposed between the body frame and the joint case. The tiltable tricycle further includes a belt-type automatic transmission mechanism and a primary speed reducer gear mechanism incorporated in the power unit, a secondary speed reducer gear mechanism incorporated in the rear axle support case, and a chain operatively interconnecting the primary and secondary speed reducer gear mechanisms. The rear axle support case has a second speed reducer shaft rotatably supported therein and offset downwardly of the rear axle assembly.

The above and other objects, features and advantages of the present invention will become more apparent from the following description when read in conjunction with the accompanying drawings in which a preferred embodiment of the present invention is shown by way of illustrative example.

BRIEF DESCRIPTION OF THE DRAWINGS

FIG. 1 is a side elevational view of a tiltable tricycle according to the present invention.

FIG. 2 is an enlarged side elevational view of a portion of the tiltable tricycle shown in FIG. 1.

DETAILED DESCRIPTION OF THE PREFERRED EMBODIMENT

Figure 3:
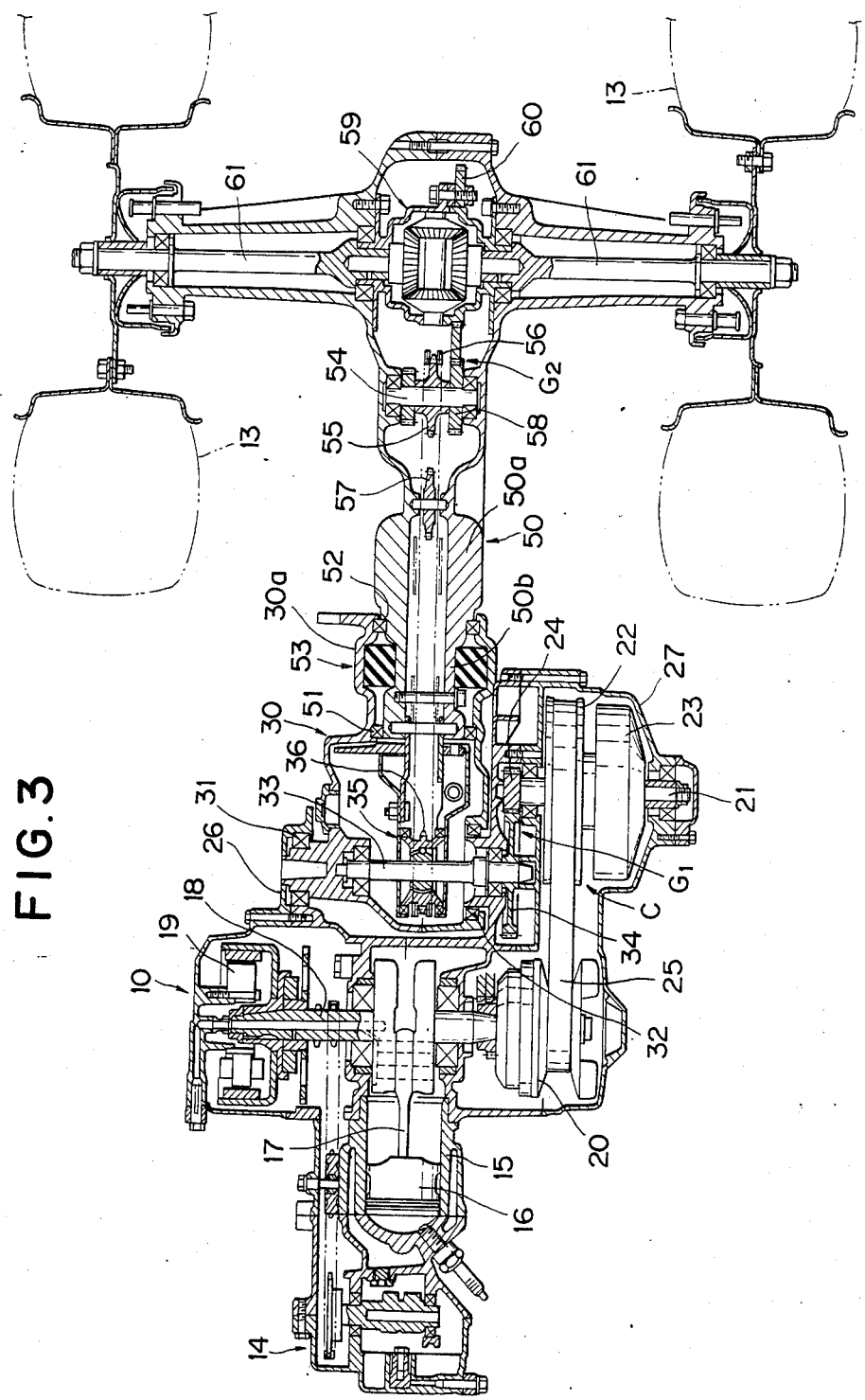
FIG. 3 is an enlarged horizontal cross-sectional view of the portion illustrated in FIG. 2.

As shown in FIG. 1, a tiltable tricycle 1 according to the present invention comprises a body frame 2 and a head pipe 3 fixed to a front end of the body frame 2. A front fork 4 is inserted through the head pipe 3 for rotation about its own axis for steering operation. The front fork 4 supports a handlebar 5 fixed to an upper end thereof and a front wheel 6 rotatably mounted on a lower end thereof, the front wheel 6 serving as a single steerable wheel.

A low floor 7 is mounted on the body frame 2 and extends longitudinally of the body frame 2 across a longitudinally central portion thereof. A seat post 9 extends upwardly from a rear end of the floor 7 and supports thereon a driver's seat 8.

A power unit 10 is mounted on a rear portion of the body frame 2 and supported at front and rear ends thereof by a bracket 11 and a support stay 12. To the rear end of the power unit 10 there is connected a vertically pivotable joint case 30 with a rear axle support case 50 coupled to a rear end thereof for lateral rolling movement. Rear axles 61, 61 (FIGS. 2 and 3), to which two rear wheels 13, 13 are connected respectively, are rotatably supported by the rear axle support case 50. A shock absorber 70 is connected between the joint case 30 and the body frame 2.

The power unit 10 comprises a single-cylinder two-cycle engine 14 having a cylinder 15 and a piston 16 slidably mounted therein, as shown in FIG. 3. The piston 16 is connected by a connecting rod 17 to a crank shaft 18. A generator 19 and a pulley 20 are mounted on opposite ends, respectively, of the crank shaft 18. The power unit 10 includes a shaft 21 located behind and extending parallel to the crank shaft 18. On the shaft 21 are mounted a pulley 22, a centrifugal clutch 23, and a gear 24 of a relatively small diameter. A V-belt 25 is trained around the pulleys 20, 22. The pulleys 20, 22, the V-belt 25, and the centrifugal clutch 23 jointly constitute a known belt-type automatic transmission mechanism C.

The power unit 10 of the foregoing construction is covered at one side with a crank case cover 26 and at the other side with a transmission case 27. The joint case 30 has a front end which is vertically swingably interconnected between the crank case cover 26 and the transmission case 27 by bearings 31, 32. The rear axle support case 50 has an extension 50a extending longitudinally of the tricyle and having a front end inserted in the rear end of the joint case 30. The rear axle support case 50 is supported on the joint case 30 by bearings 51, 52 and a Neidhart cushion mechanism 53 for lateral rolling movement about the axis of the extension 50a.

A speed reducer shaft 33 is rotatably supported in the joint case 30 and supports on one end thereof a gear 34 of a relatively large diameter held in meshing engagement with the small gear 24. The gears 24, 34 jointly constitute a primary speed reducer gear mechanism $G_1$. A constant-velocity joint 35 is mounted centrally on the speed reducer shaft 33.

Figure 4:
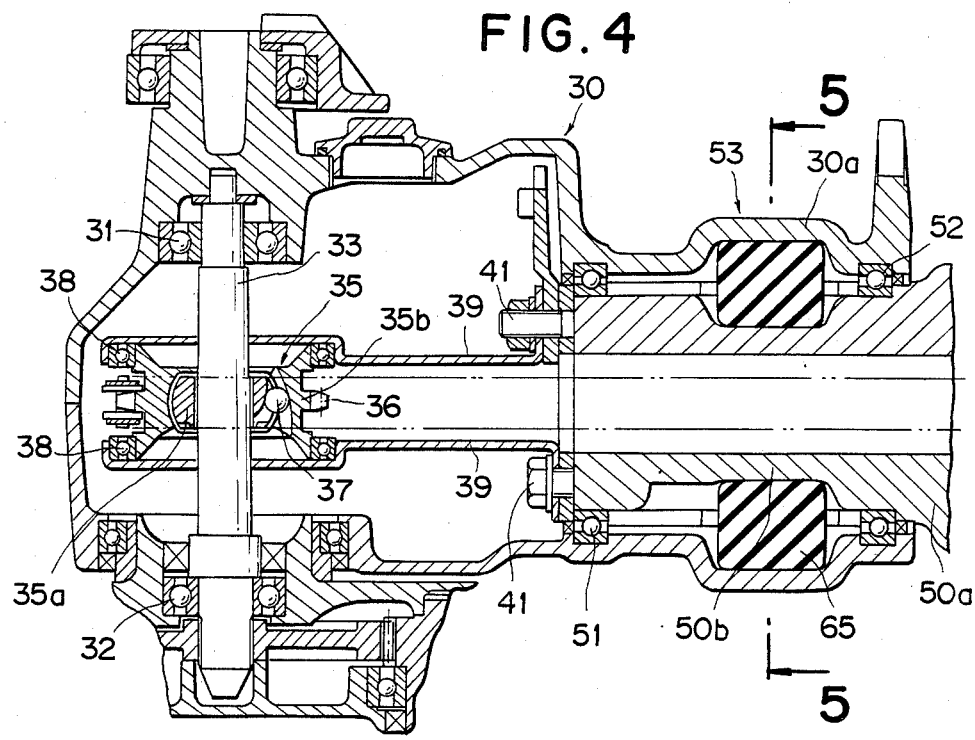
FIG. 4 is an enlarged cross-sectional view of a joint case shown in FIG. 3.

As shown in FIG. 4, the constant-velocity joint 35 comprises an inner wheel 35a fitted over the speed reducer shaft 33, an outer wheel 35b disposed radially outwardly of the inner wheel 35a, and a plurality (six in the illustrated embodiment) of balls 37 positioned between the inner and outer wheels 35a, 35b. A chain sprocket 36 is integrally mounted on an outer circumferential surface of the outer wheel 35b. As illustrated in FIG. 3, a speed reducer shaft 54 is rotatably mounted in the rear axle support case 50, and a chain sprocket 55 is fitted over the speed reducer shaft 54. A driving chain 56 is trained around the chain sprocket 36 on the speed reducer shaft 33 and the chain sprocket 55 on the speed reducer shaft 54 and is kept under an appropriate tension by a tensioner 57. The outer wheel 35b is held on a pair of guide members 39, 39 by bearings 38, 38 on opposite sides of the outer wheel 35b, the guide members 39, 39 being fastened by bolts 41 to the front end of the rear axle support case 50.

As shown in FIGS. 2 and 3, a gear 58 of a relatively small diameter is fitted over the speed reducer shaft 54 and held in meshing engagement with a gear 60 of a relatively large diameter bolted to an outer periphery of a differential unit 59 rotatably supported in the rear axle support case 50. The gears 58, 60 jointly constitute a secondary speed reducer gear mechanism $G_2$. The rear wheel axles 61, 61 extend laterally from opposite sides of the differential unit 59, and the rear wheels 13, 13 are fixed to the outer ends of the rear wheel axles 61, 61, respectively.

When the engine 18 is started, the crank shaft 14 is rotated about its own axis. The speed of rotation of the crank shaft 18 is reduced by the automatic transmission mechanism C. The rotative power as reduced in speed is then transmitted to the shaft 21, which is caused to rotate about its own axis. The speed of rotation of the shaft 21 is sufficiently reduced by the primary speed reducer gear mechanism $G_1$, and then the rotative power as reduced in speed is transmitted to the speed reducer shaft 33. The rotation of the shaft 33 causes the outer wheel 35b of the constant-velocity joint 35 to rotate at a constant velocity, and the chain sprocket 36 on the outer wheel 35b rotates in unison therewith. The rotation of the chain sprocket 36 is transmitted through the chain 56 and the other sprocket 55 to the speed reducer shaft 54, which is then driven to rotate about its own axis. The speed of rotation of the shaft 54 is reduced by the secondary speed reducer gear mechanism $G_2$. The rotative power as thus reduced in speed is then transmitted through the differential unit 59 to the rear wheel axles 61, 61 to drive the rear wheels 13, 13.

The outer wheel 35b with the chain sprocket 36 integrally formed on the outer periphery thereof is held at its opposite ends by the guide members 39, 39 against undesirable lateral or axial movement. Therefore, the chain sprocket 36 is prevented from wobbling in the lateral or axial direction, so that the chain 56 is effectively prevented from being twisted. The chain 56 is accordingly protected from any unwanted disengagement or breakage which would otherwise be caused by the twisting thereof, and will have an increased durability.

When the rear wheels 13, 13 move up and down as the tricycle runs on a rough road surface, the rear axle support case 50 and the joint case 30 by which the rear wheels 13, 13 are supported are angularly moved up and down about the bearings 31, 32, that is, the speed reducer shaft 33. The axis of the the rear axle support case 50 and the joint case 30 as they swing vertically is indicated by the straight line L in FIG. 2. The speed reducer shaft 54 on which the gear 58 is mounted is offset or displaced downwardly by a distance ε from the rear wheel axles 61, 61 in the arrangement of the secondary speed reducer gear mechanism $G_2$. The axis L passes through a position directly below the rear wheel axles 61 which is spaced downwardly therefrom by a distance E. Any shocks resulting from the vertical swinging movement of the rear axle support case 50 and the joint case 30, that is, the rear wheels 13, 13, are effectively taken up and dampened by the shock absorber 70.

Figure 5:
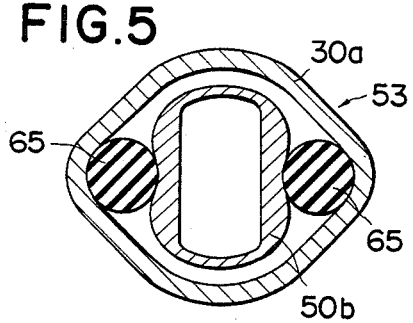
FIG. 5 is a cross-sectional view taken along line 5—5 of FIG. 4.
Figure 6:
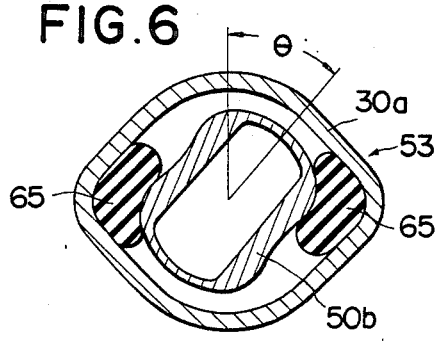
FIG. 6 is a view similar to FIG. 5, showing the joint case and a rear axle case which are turned with respect to each other.

As shown in FIGS. 5 and 6, the joint case 30 has a rear end portion 30a of a substantially elliptical cross section, and the rear axle support case 50 has a front end portion 50b having an outer periphery of a substantially gourd-shaped cross section. The end portions 30a, 50b serve respectively as outer and inner housings of the Neidhart cushion mecahnism 53. The Neidhart cushion mechanism 53 includes two cylindrical rubber bodies 65, 65 interposed between the outer and inner housings 30a, 50b.

When the tricycle turns around a corner, the power unit 10 and the joint case 30 roll laterally together with the body while the rear wheels 13, 13 stay in contact with the road surface, and the rear axle support case 50 remains immovable against such rolling movement. When one of the rear wheels 13, 13 runs over a bump on the road, only the rear axle support case 50 rolls laterally. At this time, the outer and inner housings 30a, 50b of the Neidhart cushion mechanism 53 turn relatively through an angle θ as shown in FIG. 6. The relative angular movement of the outer and inner housings 30a, 50b causes the rubber bodies 65, 65 interposed therebetween to undergo shearing deformation as well as compression, whereupon the rubber bodies 65, 65 tend to spring back to return the body or the rear wheels resiliently to the original posture.

Figure 7:
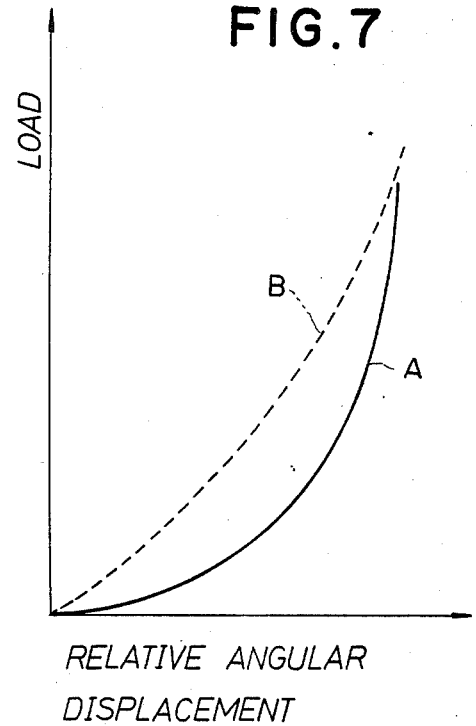
FIG. 7 is a graph showing characteristic curves of Neidhart cushion mechanisms.

Because of the elliptical cross section of the outer housing 30a and the gourd-shaped cross section of the outer periphery of the inner housing 50b, the rubber bodies 65, 65 are subjected to little elastic deformation as long as the relative angular displacement θ of the outer and inner housings 30a, 50b is small. In such a relatively angular displacement range, the rubber bodies 65, 65 suffer from a small load and hence have small restoring forces. As the relatvie angle θ is increased, the rubber bodies 65, 65 are elastically deformed to a greater extent, and their restoring forces become progressively larger. When the relative angular displacement of the housings 30a, 50b approaches a critical point as shown in FIG. 6, the forces tending to restore the housings 30a, 50b are increased sharply. The Neidhart cushion mechanism 53 of the present invention has a characteristic curve A as shown in FIG. 7, and a conventional Neidhart cushion mechanism has a characteristic curve B. Comparison of the characteristic curves A, B indicates that the restoring force of the Neidhart cushion mechanism 53 of the invention remains smaller in a small range of relative angular displacements than that of the prior Neidhart cushion mechanism. As a consequence, the tiltable tricycle according to the present invention can be tilted laterally and maneuvered well under driver's control while the tricycle is tilted through a relatively small angle, such as when turning a corner. As the angle of tilt is increased, the force tending to return the tricycle is also increased for increased maneuvering stability. The Neidhart cushion mechanism of the invention requires only two rubber bodies rather than four rubber bodies that have heretofore been necessitated, and for this reason can be manufactured less expensively.

With the arrangement of the present invention, the unsprung weight of the shock absorber 70 is composed of the weights of the joint case 30 and the rear axle support case 50, and does not incude the weight of the power unit 10. Since the power unit 10 incorporates therein the automatic transmission mechanism C which is heavy and the primary speed reducer gear mechanism G₁, the unsprung weight of the shock absorber 70 is greatly reduced, and any moment of inertia induced when the rear wheels 13, 13 move up and down is rendered small. This allows the rear wheels 13, 13 to follow rough road surfaces quite well for better riding comfort and more stable maneuverability.

The joint case 30 serves as an unsprung weight only when it is moved up and down, and as a sprung weight when it rolls laterally due to the intermediary of the Neidhart cushion mechanism 53 between the joint case 30 and the rear axle support case 50. Accordingly, any lateral wobbling movement of the tricycle body caused when the rear wheels 13, 13 are vertically moved out of synchronism can be held to a minimum, resulting in more improved riding comfort and maneuvering stability.

Since the rotative power from the engine 14 is sufficiently reduced in speed by the automatic transmission C and the primary speed reducer gear mechanism G₁ before the power reaches the constant-velocity joint 35, the latter is not subjected to an undue load and will have better durability. The speed of travel of the chain 56 is also reduced, and sounds produced when the chain 56 runs around the sprockets 36, 55 in meshing engagement therewith are lowered, contributing to efforts for noise reduction.

The axis L of the rear axle support case 50 and the joint case 30 as they are angularly moved up and down when the rear wheels 13, 13 move up and down is located sufficiently below the rear wheel axles 61. This arrangement maintains sufficiently high maneuvering stability. Since the speed reducer shaft 54 is offset downwardly of the rear wheel axles 61, 61 which remain held in a higher position, the minimum height required of the tricycle body above ground is maintained for allowing the tricycle the ability to run over bumpy roads.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:
1. A tiltable tricycle comprising:
 (a) a body frame;
 (b) a single front wheel steerably supported on a front portion of said body frame;
 (c) a power unit mounted on a rear portion of said body frame and including at least an engine having a crankshaft;
 (d) a joint case connected to said power unit for vertical angular movement and including a first speed reducer shaft rotatably supported therein and operatively connected to said crankshaft;
 (e) a rear axle support case connected to said joint case for lateral rolling movement and including a second speed reducer shaft rotatably supported therein;
 (f) a secondary speed reducer mechanism incorporated in said rear axle support case;
 (g) a rear axle assembly rotatably supported on said rear axle support case;
 (h) a pair of rear wheels coupled to said rear axle assembly, respectively; and
 (i) a shock absorber disposed between said body frame and said joint case;
 said second speed reducer shaft being offset downwardly of said rear axle assembly.

2. A tiltable tricycle according to claim 1, wherein said power unit includes a crank case cover covering one side thereof and a transmission case covering the opposite side thereof, and said joint case has a front end supported between said crank case cover and said transmission case.

3. A tiltable tricycle according to claim 1, further including a belt-type automatic transmission mechanism, a primary speed reducer gear mechanism incorporated in said power unit, and a chain operatively interconnecting said primary and secondary speed reducer gear mechanisms.

4. A tiltable tricycle according to claim 3, wherein said belt-type automatic transmission mechanism comprises a driving pulley mounted on one end of said crank shaft, a driven shaft extending parallel to said crank shaft, a driven pulley and a centrifugal clutch mounted on said driven shaft, and a V-belt trained around said driving pulley and said driven pulley.

5. A tiltable tricycle according to claim 4, wherein said primary speed reducer gear mechanism comprises a first gear mounted on said driven shaft and a second gear mounted on said first speed reducer shaft, said primary speed reducer gear mechanism being implemented to operatively interconnect said engine and said first speed reducer shaft.

6. A tiltable tricycle according to claim 5, wherein said secondary speed reducer gear mechanism comprises a third gear mounted on said second speed reducer gear and a fourth shaft operatively coupled to said rear axle assembly.

7. A tiltable tricycle according to claim 6, wherein said rear axle support case has a differential unit rotatably supported therein, said rear axle assembly comprises a pair of axles extending transversely from opposite sides of said differential unit, and said fourth gear is connected to an outer periphery of said differential unit.

* * * * *

UNITED STATES PATENT AND TRADEMARK OFFICE
CERTIFICATE OF CORRECTION

PATENT NO. : 4,678,053
DATED : July 7, 1987
INVENTOR(S) : Masaki WATANABE et al.

It is certified that error appears in the above-identified patent and that said Letters Patent is hereby corrected as shown below:

Column 3, line 57, after "engine" change "18" to --14--; after "shaft" change "14" to --18--.
Column 5, line 5, correct the spelling of --relative--.
Claim 6, line 4, (Column 7, line 4), change "gear" to --shaft--.
Claim 6, line 4, (Column 7, line 4), change "shaft" to --gear--.

Signed and Sealed this

Nineteenth Day of January, 1988

Attest:

DONALD J. QUIGG

*Attesting Officer*　　　　*Commissioner of Patents and Trademarks*